United States Patent [19]

Williams

[11] Patent Number: 4,919,439

[45] Date of Patent: Apr. 24, 1990

[54] BALANCED RING SEAL

[75] Inventor: Gregg G. Williams, Milford, Mich.

[73] Assignee: Williams International Corporation, Walled Lake, Mich.

[21] Appl. No.: 106,391

[22] Filed: Oct. 9, 1987

[51] Int. Cl.$^5$ .................... F16J 15/34; F16J 15/54
[52] U.S. Cl. ........................ 277/27; 277/83; 277/94; 277/137; 277/173; 415/173.7; 415/174.5
[58] Field of Search ............ 277/173, 176, 83, 94, 277/93 R, 56, 27, 136, 137; 415/111, 113, 170 R, 170 A; 416/95, 174

[56] References Cited

U.S. PATENT DOCUMENTS

| | | | |
|---|---|---|---|
| 1,111,312 | 9/1914 | Ljungstrom | 277/56 |
| 1,187,212 | 6/1916 | Westinghouse | 277/56 |
| 2,141,102 | 12/1938 | Brooke | 277/83 |
| 2,970,750 | 2/1961 | Swearington | 415/170 A |
| 3,188,095 | 6/1965 | Van Vleet | 277/83 X |
| 3,357,708 | 12/1967 | Parr | 277/56 |
| 3,554,661 | 1/1971 | Oglesby et al. | 415/170 A X |
| 3,558,236 | 1/1971 | Bylsma | 415/170 A X |
| 3,972,536 | 8/1976 | Warner et al. | 277/83 |
| 4,218,789 | 8/1980 | Pask | 277/56 X |

FOREIGN PATENT DOCUMENTS 495859 9/1953 Canada .................... 277/56

Primary Examiner—Allan N. Shoap
Attorney, Agent, or Firm—Lyman R. Lyon

[57] ABSTRACT

A ring seal comprises an annular seal segment that is fixed against rotation but is axially movable relative to a fixed seal segment. The axially movable seal segment has substantially equal oppositely facing exposed radial surfaces whereby fluid pressure acting against the rotatable segment is substantially balanced in opposite axial directions.

2 Claims, 1 Drawing Sheet

BALANCED RING SEAL

BACKGROUND OF THE INVENTION

Ring seals are often used to maintain a pressure differential between relatively rotatable sections of a turbine engine. For example, it is desirable to separate high pressure compressed air from adjacent bearing cavities, etc. A typical arrangement comprises a compressor section or shaft that is journaled for rotation relative to a fixed housing. A ring seal is accommodated in a groove in the rotatable section. The ring seal is secured against rotation but free to move axially. During normal operation, the ring seal is driven toward the low pressure section by the pressure differential between the sections. Movement of the ring seal toward the low pressure section is balanced by friction between the outer stationary member and the ring seal which effectively reduces axial reaction forces on the shaft to a value which approaches zero. This is desirable for satisfactory operation, but is a condition that exists only when the shaft is shifting toward the low pressure section. Stated in another manner, the ring seal tends to shift with the shaft toward the low pressure section due to a combination of the pressure differential across the seal and engagement thereof by the high pressure side of the shaft groove which balances out the axial reaction force of the fixed section against movement of the seal. Thus, minimum force must be exerted by the rotating section against the ring seal.

On the other hand, when the shaft or rotating section shifts toward the high pressure side of the ring seal, the low pressure side of the shaft groove must exert sufficient force to overcome both the pressure differential across the ring seal and friction between the ring seal and the stationary section. If this force is excessive, unacceptable heat is generated and wear will occur. For this reason, ring seals for high speed shafts and dry running shafts are limited to relatively low pressure drops across the ring seal.

SUMMARY OF THE INVENTION

The ring seal of the present invention is usable to seal relatively large pressure differentials between relatively rotating sections of a turbine engine by balancing the pressure forces on the seal so as to control friction and pressure loads on a floating ring element of the seal. One feature of the invention is that the mean radius to the radially extending surfaces of a groove in a rotatable element of the seal, which provide axial sealing and location, are at the same radius as the cylindrical surface of the fixed seal element upon which the ring element of the seal slides. This feature causes the axial component of the pressure forces to be substantially balanced. The ring seal element may be split in the manner of a piston ring so that it can accommodate differential expansion of the engine components. Both gas pressure and an inherent spring force maintain contact between the ring seal element and the fixed elements of the seal. An anti-rotation pin prevents the ring seal element from rotating with the rotating section of the engine.

DETAILED DESCRIPTION OF THE PREFERRED EMBODIMENT OF THE INVENTION

Figure 1:
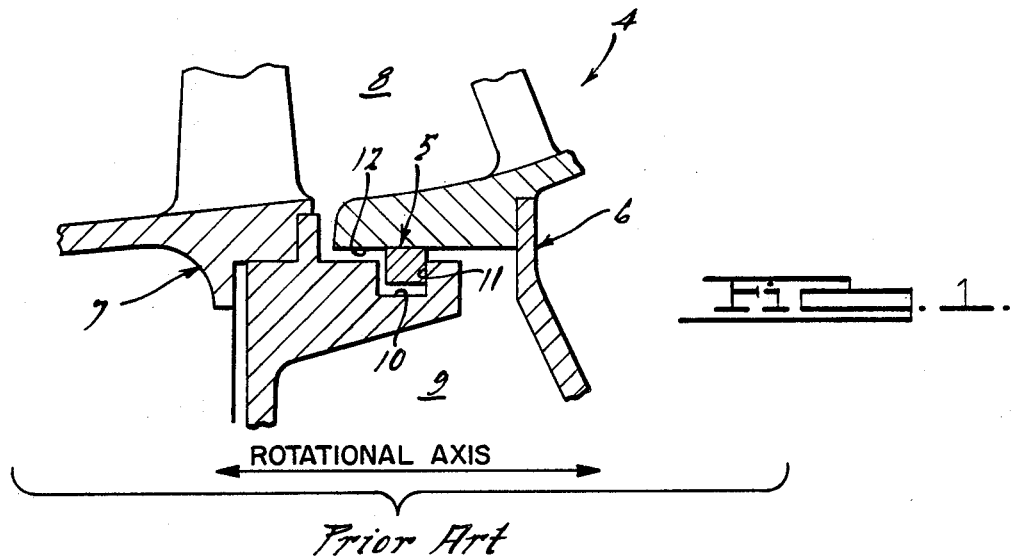
FIG. 1 is a cross-sectional view of a ring seal in accordance with the prior art.

Referring to FIG. 1 of the drawing, a turbine engine 4 is provided with a prior art ring seal 5. The ring seal 5 is disposed between a fixed section 6 and a rotating compressor section 7 of the engine 4. The ring seal 5 isolates a high pressure region 8 from a relatively low pressure region 9. The ring seal 5 is accepted in a complementary groove 10 in the rotating section 7. When the rotating section 7 shifts to the left, as seen in FIG. 1 of the drawing, friction between a radial face 11 of the groove 10 and the ring seal 5 may become excessive since both the pressure differential between the high pressure region 8 and low pressure region 9 and friction between the seal ring 5 and a cylindrical surface 12 of fixed element 6 must be overcome.

Figure 3:
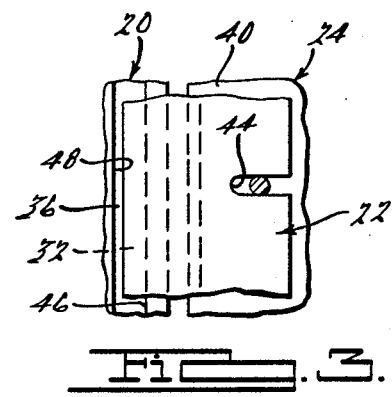
FIG. 3 is a view taken along the line 3—3 of FIG. 2.
Figure 2:
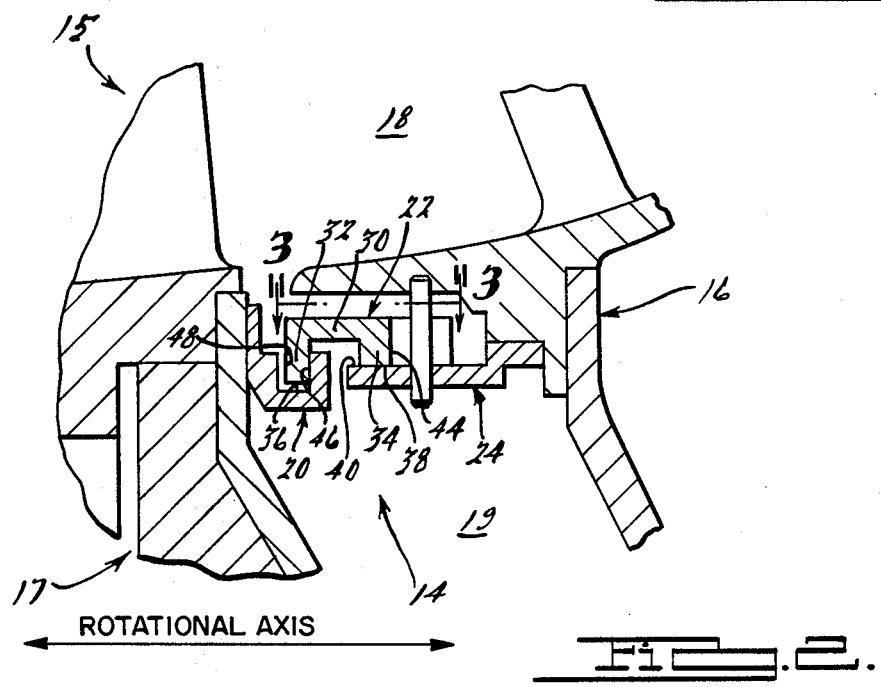
FIG. 2 is a cross sectional view of a balanced ring seal in accordance with the instant invention.

As seen in FIG. 3 and in accordance with the instant invention, a ring seal assembly 14 is shown in the environment of a turbine engine 15. The ring seal assembly 14 extends between a fixed section 16 and a rotatable compressor section 17 of the engine 15 so as to isolate a high pressure region 18 from a low pressure region 19.

The ring seal assembly 14 comprises three annular carbon segments 20, 22, and 24. The seal segment 20 is secured to the rotating section 17 and the seal segment 24 is secured to the fixed section 16 of the engine 15. The seal segment 22 is free to move axially relative to the segments 20 and 24 since the leg portion 32 of the seal segment 22 is of smaller axial dimension than the groove 36 and the leg 34 of the segment 22 is free to slide upon the surface 40 of the segment 24.

The seal segment 22 is of inverted "U"-shaped cross section defined by a longitudinal bight portion 30 and radially inwardly extending leg portions 32 and 34. The leg portion 32 is accepted in a complementary groove 36 in the seal segment 20. The leg portion 34 has a radially inwardly facing annular face 38 that bears against a complementary cylindrical surface 40 on the seal segment 24. A retainer pin 42 extends between the fixed housing 16 and the seal segment 24 and is accepted in a complementary notch 44 in the seal segment 22 to preclude indexing thereof relative to the fixed section 16 of the engine 15.

A feature of the instant invention is that the mean radius to a pair of axially spaced and opposed axially facing surfaces 46 and 48 of the groove 36 in the seal segment 20 is equal to the radius of the surface 40 of seal segment 24. Thus, since the seal segment 22 is exposed to high pressure in both directions axially, there is substantial balancing of the axial component of forces operative on the seal element segment.

The seal segment 22 may be split in the manner of a piston ring if desired so that it can accommodate differential expansion of the rotating and stationary segments 20 and 24, respectively. In this case, both fluid pressure and the inherent radial spring force of the seal segment 22 maintains contact between the seal segment 22 and the seal segment 24.

While the preferred embodiment of the invention has been disclosed, it should be appreciated that the invention is susceptible of modification without departing from the scope of the following claims.

I claim:

1. A balanced ring seal comprising a fixed seal segment having a cylindrical radially outwardly orientated bearing surface, a rotatable seal segment having a circular radially outwardly opening groove therein defining a pair of axially spaced oppositely axially facing bearing surfaces, and a cylindrical axially movable seal segment of radially inwardly opening "U"-shaped cross section defined by a bight portion and a pair of axially spaced radially inwardly extending leg portions, one of said leg portions having radially extending faces on opposite sides thereof engagable, selectively, with one of the axially facing bearing surfaces of said rotatable seal segment, the other of said leg portions having an annular radially inwardly facing bearing surface engagable with the radially outwardly facing bearing surface on said cylindrical seal element.

2. A seal in accordance with claim 1 comprising a radially extending pin supported by said fixed seal segment, said axially movable seal segment having a notch therein for the acceptance of said pin whereby rotation of said axially movable seal segment relative to said fixed seal segment is precluded.

* * * * *